United States Patent
Nadav

(10) Patent No.: US 11,481,400 B1
(45) Date of Patent: *Oct. 25, 2022

(54) ANALYTICAL TOOL FOR EVALUATION OF MESSAGE CONTENT

(71) Applicant: Wells Fargo Bank, N.A., San Francisco, CA (US)

(72) Inventor: Carmel Nadav, Eagan, MN (US)

(73) Assignee: Wells Fargo Bank, N.A., San Francisco, CA (US)

( * ) Notice: Subject to any disclaimer, the term of this patent is extended or adjusted under 35 U.S.C. 154(b) by 656 days.

This patent is subject to a terminal disclaimer.

(21) Appl. No.: 16/384,663

(22) Filed: Apr. 15, 2019

Related U.S. Application Data

(63) Continuation of application No. 15/177,110, filed on Jun. 8, 2016, now Pat. No. 10,268,729.

(51) Int. Cl.
| | |
|---|---|
| *G06F 16/20* | (2019.01) |
| *G06F 16/2457* | (2019.01) |
| *H04L 51/04* | (2022.01) |
| *H04L 51/42* | (2022.01) |
| *H04L 51/52* | (2022.01) |
| *H04L 51/00* | (2022.01) |

(52) U.S. Cl.
CPC ........ *G06F 16/24575* (2019.01); *H04L 51/04* (2013.01); *H04L 51/42* (2022.05); *H04L 51/52* (2022.05)

(58) Field of Classification Search
CPC ... G06F 16/24575; H04L 51/04; H04L 51/22; H04L 51/32

See application file for complete search history.

(56) References Cited

U.S. PATENT DOCUMENTS

| | | |
|---|---|---|
| 4,773,009 A | 9/1988 | Kucera et al. |
| 8,024,668 B2 | 9/2011 | Nickerson et al. |
| 8,291,014 B2 | 10/2012 | Cierniak et al. |
| 8,423,610 B2 | 4/2013 | Cierniak et al. |

(Continued)

OTHER PUBLICATIONS

Cho et al. "An analysis of online customer complaints: implications for Web complaint management," Proceedings of the 35th Hawaii International Conference on System Sciences, Sep. 2002, 10 pp.

(Continued)

*Primary Examiner* — Kristopher Andersen
(74) *Attorney, Agent, or Firm* — Shumaker & Sieffert, P.A.

(57) ABSTRACT

Techniques are described for evaluating message content in each of a plurality of messages in order to improve communication between customers and customer service representatives. The disclosed techniques enable efficient evaluation of the message content in each of the messages in order to determine a readability score for each of the messages. A computing device performs the efficient evaluation by processing the message content into a binary representation using a first value to represent vowels and a second value to represent non-vowels. The binarization of the message content allows the computing device to perform a syllable count and determine a readability score for each of the plurality of messages, which may include millions of messages. Based on the readability scores, the computing device may identify readability gaps between the representative messages and the customer messages, and generate subsequent representative messages that reduce the identified readability gaps.

15 Claims, 5 Drawing Sheets

(56) References Cited

U.S. PATENT DOCUMENTS

| | | |
|---|---|---|
| 8,452,777 B2 | 5/2013 | Rose |
| 8,527,276 B1 | 9/2013 | Senior et al. |
| 8,600,854 B2 | 12/2013 | Mayr et al. |
| 8,886,800 B2 | 11/2014 | Voien |
| 9,069,743 B2 | 6/2015 | Kotler et al. |
| 9,268,769 B1 | 2/2016 | Shalit et al. |
| 2003/0167197 A1 | 9/2003 | Shoemaker et al. |
| 2005/0071888 A1 | 3/2005 | Girourd et al. |
| 2007/0127693 A1 | 6/2007 | D'Ambrosio et al. |
| 2009/0055386 A1 | 2/2009 | Boss et al. |
| 2009/0187818 A1 | 7/2009 | Compton et al. |
| 2010/0153425 A1 | 6/2010 | Tulchinsky |
| 2012/0035977 A1 | 2/2012 | Wells et al. |
| 2014/0074727 A1 | 3/2014 | Miao |
| 2014/0075312 A1 | 3/2014 | Dingsor et al. |
| 2014/0280236 A1 | 9/2014 | Faller et al. |
| 2015/0019513 A1 | 1/2015 | Dey et al. |
| 2016/0162474 A1 | 6/2016 | Agarwal et al. |
| 2017/0193091 A1 | 7/2017 | Byron et al. |

OTHER PUBLICATIONS

Lee et al., "Construct Dynamic Customer Complaint Ontology Using Web Ontology Language for an Intelligent and Interoperable Customer Complaint Handling System," Proceedings CIE, University of Hong Kong, Oct. 16-18, 2013, 1 pp. (Abstract Only).
Prosecution History from U.S. Appl. No. 15/177,110, dated Apr. 20, 2018 through Dec. 5, 2018, 52 pp.

| CONVO ID | MESSAGE ID | MESSAGE SENDER | MESSAGE CONTENT |
|---|---|---|---|
| 0204 | 1455 | CUSTOMER | COMPLAINT |
| | 1520 | REP | RESPONSE |
| | 1617 | CUSTOMER | ADDITIONAL COMPLAINT |
| 0223 | 1982 | CUSTOMER | COMPLAINT |
| 0256 | 2924 | CUSTOMER | COMPLAINT |
| | 2995 | REP | RESPONSE |
| 0397 | 3153 | REP | OFFER |
| | 3178 | CUSTOMER | OFFER RESPONSE |

| CONVO ID | MESSAGE ID | MESSAGE SENDER | MESSAGE SCORE | CONVO DIFF |
|---|---|---|---|---|
| 0204 | 1455 | CUSTOMER | 5-GRADE | 2 |
| | 1520 | REP | 7-GRADE | |
| | 1617 | CUSTOMER | 5-GRADE | |
| 0223 | 1982 | CUSTOMER | 12-GRADE | NA |
| 0256 | 2924 | CUSTOMER | 10-GRADE | 3 |
| | 2995 | REP | 7-GRADE | |
| 0397 | 3153 | REP | 7-GRADE | 0 |
| | 3178 | CUSTOMER | 7-GRADE | |

FIG. 4

ANALYTICAL TOOL FOR EVALUATION OF MESSAGE CONTENT

This application is a continuation of U.S. application Ser. No. 15/177,110, filed Jun. 8, 2016, the contents of which are hereby incorporated by reference in their entirety.

TECHNICAL FIELD

The disclosure relates to readability analysis of message content.

BACKGROUND

Customer service experiences often have a large impact on customers' perception of a company, such as a bank or other financial institution, and customers' willingness to give that company repeat business. For example, a positive customer service experience with a bank may increase the likelihood that a customer will respond to a new product offering from the bank, such as a new loan program or credit offering, open new accounts with the bank, and maintain or increase the account balances in their existing accounts with the bank. Conversely, a negative customer service experience with the bank may increase the likelihood that the customer will ignore new product offerings, reduce their account balances, or completely close their accounts with the bank.

In some cases, a negative customer service experience may be the result of a communication breakdown or simple misunderstanding between the customer and a customer service representative for the company. For example, a customer may be unable to understand the terms and conditions associated with a given product offered by the bank, which may result in the customer being charged additional fees or not receiving the services they expected. As another example, a customer may be unable to understand a customer service representative's response to a complaint, which may result in a failure to reach a timely resolution.

SUMMARY

In general, this disclosure describes techniques for evaluating message content in each of a plurality of messages in order to improve communication between customers and customer service representatives. Representative messages directed to customers, e.g., in the form of product offers or responses from customer service representatives, may result in negative customer service experiences if the customer is unable to understand the message contents. Such misunderstandings may occur when the message contents of the representative messages are generated to have a reading level that is substantially different than that of customer messages, e.g., more than two grade levels different. The number of messages transmitted between customers and customer service representatives may make manual evaluation of message contents and associated reading levels unworkable.

The disclosed techniques enable efficient evaluation of message content in each of a plurality of messages in order to determine a readability score for each of the messages. In accordance with the disclosed techniques, a computing device performs the efficient evaluation by processing the message content into a binary representation using a first value to represent vowels and a second value to represent non-vowels. The binarization of the message content in each of the plurality of messages allows the computing device to efficiently perform a syllable count and determine a readability score for each of the plurality of messages, which may include a relatively large number of messages (e.g., millions of messages). Based on the readability scores, the computing device may identify readability gaps between the representative messages and the customer messages that result in negative outcomes, and generate subsequent representative messages that reduce or close the identified readability gaps.

In one example, this disclosure is directed to a method comprising evaluating, by a computing device, message content in each of a plurality of messages, wherein the plurality of messages includes customer messages received from customers and representative messages sent to the customers, wherein evaluating the message content includes: processing the message content in each of the plurality of messages using a first value to represent vowels and a second value to represent non-vowels, performing a syllable count based on a number of times the first value appears in the processed message content in each of the plurality of messages, and determining a readability score for each of the plurality of messages according to a readability metric based on the syllable count. The method further comprises analyzing, by the computing device, the readability score for one or more of the plurality of messages, and generating, by the computing device, message content for subsequent representative messages based on the analysis.

In another example, this disclosure is directed to a computing device comprising one or more storage units configured to store readability scores for a plurality of messages, and one or more processors in communication with the one or more storage units. The one or more processors configured to evaluate message content in each of the plurality of messages, wherein the plurality of messages includes customer messages received from customers and representative messages sent to the customers, wherein the one or more processors are further configured to: process the message content in each of the plurality of messages using a first value to represent vowels and a second value to represent non-vowels, perform a syllable count based on a number of times the first value appears in the processed message content in each of the plurality of messages, and determine a readability score for each of the plurality of messages according to a readability metric based on the syllable count. The one or more processors are further configured to analyze the readability score for one or more of the plurality of messages, and generate message content for subsequent representative messages based on the analysis.

A non-transitory computer-readable medium comprising instructions that when executed cause one or more processors to evaluate message content in each of a plurality of messages, wherein the plurality of messages includes customer messages received from customers and representative messages sent to the customers, wherein the instructions further cause the one or more processors to: process the message content in each of the plurality of messages using a first value to represent vowels and a second value to represent non-vowels, perform a syllable count based on a number of times the first value appears in the processed message content in each of the plurality of messages, and determine a readability score for each of the plurality of messages according to a readability metric based on the syllable count. The instructions further cause the one or more processors to analyze the readability score for one or more of the plurality of messages, and generate message content for subsequent representative messages based on the analysis.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 4 is a conceptual diagram illustrating one example of a score dataset from FIG. 2.

DETAILED DESCRIPTION

Figure 1:
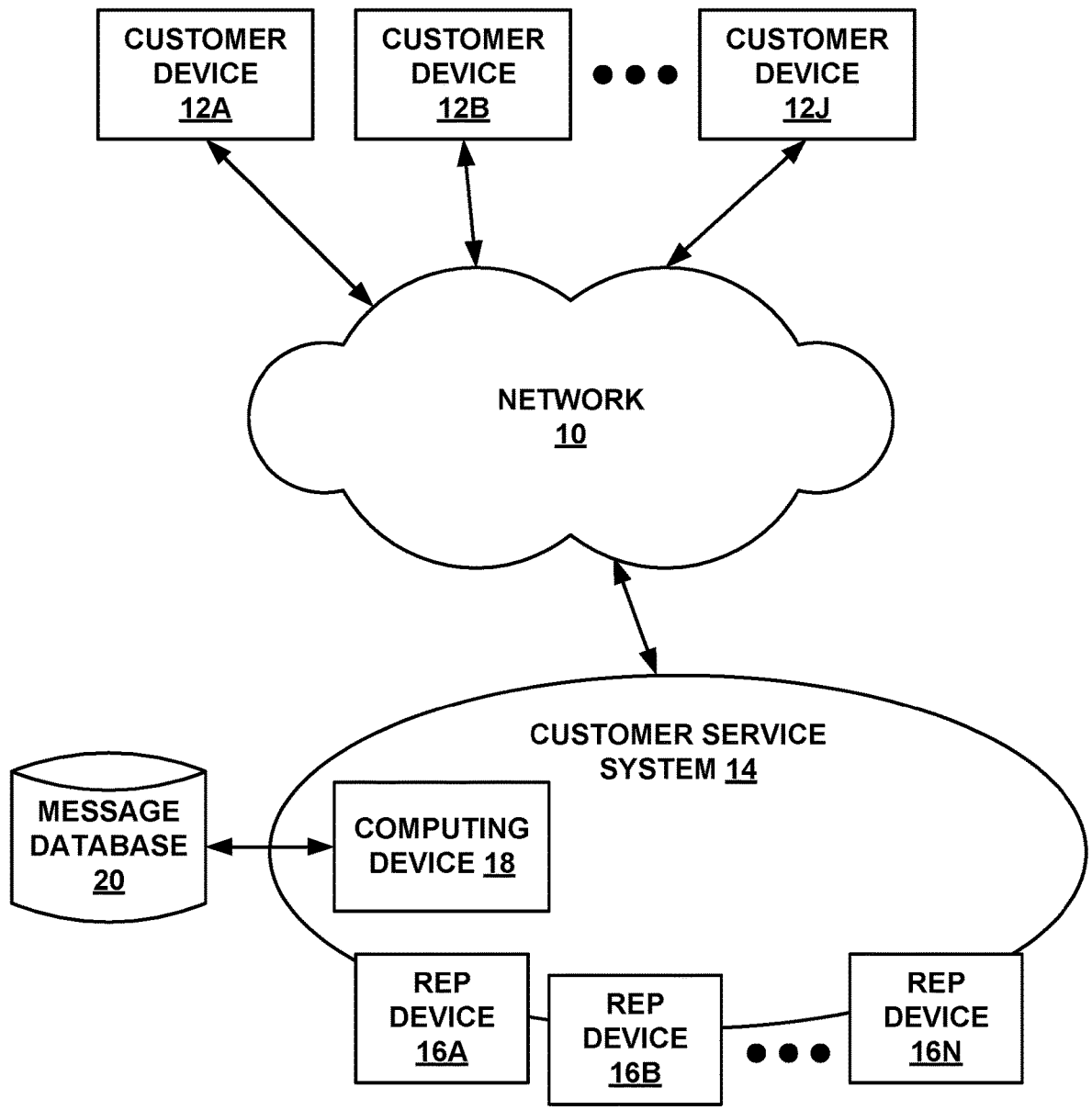
FIG. 1 is a block diagram illustrating an example customer service system that includes a computing device configured to evaluate message content for each of a plurality of messages to improve communication between customers and customer service representatives, in accordance with the techniques of this disclosure.

FIG. 1 is a block diagram illustrating an example customer service system 14 that includes a computing device 18 configured to evaluate message content for each of a plurality of messages in message database 20 to improve communication between customers and customer service representatives, in accordance with the techniques of this disclosure.

As discussed in further detail below, a negative customer service experience may be the result of a communication breakdown or simple misunderstanding between a customer and a customer service representative. Such misunderstandings may occur when message contents of representative messages are generated at a reading level that is substantially different than that of customer messages. The disclosed techniques enable computing device 18 within customer service system 14 to perform efficient evaluation of message content in each of the plurality of customer and representative messages in message database 20 in order to determine a readability score for each of the messages. Based on the readability scores, computing device 18 may identify readability gaps between the representative messages and the customer messages that result in negative outcomes, and generate subsequent representative messages that reduce or close the identified readability gaps.

Customer service system 14 may provide customer service for any business, including, for example, physical and online retail stores, physical and online service providers, hospitals and medical groups, utilities, government bodies, and the like. For purposes of explanation, customer service system 14 is described herein as providing customer service for a financial institution, such as a bank. It should be understood, however, that the financial institution is merely one example, and the application of the disclosed techniques should not be so limited.

In the illustrated example of FIG. 1, customers of a financial institution may access customer service system 14 of the financial institution via customer devices 12A-12J (collectively "customer devices 12") and network 10. The customers may access customer service system 14 in order to report complaints or to respond to product offers or other communications received from the financial institution. The messages received at customer service system 14 from customer devices 12 are referred to herein as "customer messages." Conversely, customer service representatives for the financial institution may communicate with the customers via representative devices 16A-16N (collectively "representative devices 16") within customer service system 14 and network 10. The customer service representatives may send "representative messages" from representative devices 16 within customer service system 14 to customer devices 12 in order to respond to customer complaints or to send product offers or other communications from the financial institution to the customers.

Customer devices 12 may comprise any of a wide range of user devices used by the customers of the financial institution, including laptop or desktop computers, tablet computers, so-called "smart" phones, "smart" pads, "smart" watches, or other personal digital appliances equipped for wired or wireless communication. Customer devices 12 may each include at least one user interface device (not shown) that enables a customer to interact with the customer device. In some examples, the user interface devices of customer devices 12 may be configured to receive tactile, audio, or visual input. In addition to receiving input from users, the user interface devices of customer devices 12 may be configured to output content such as graphical user interfaces (GUIs) for display to the customers, e.g., at display devices associated with customer devices 12.

Customer service system 14 may be part of a centralized or distributed system of one or more computing devices, such as such as desktop computers, laptops, workstations, wireless devices, network-ready appliances, file servers, print servers, or other devices. In some examples, customer service system 14 may be hosted by the financial institution and provide customer service for all or a portion of the financial institution. In other examples, customer service system 14 may be a third-party customer service provider that provides customer service for multiple different businesses, including the financial institution.

As illustrated in FIG. 1, customer service system 14 includes representative devices 16 used by the customer service representatives. In the example where customer service system 14 is hosted by the financial institution, the customer service representatives may be employees of the financial institution in either a dedicated customer service role or in another role, such as a teller, banker, financial analyst, or the like. In this example, representative devices 16 may include laptop or desktop computers connected to a private network associated with the financial institution. In this and other examples, however, representative devices 16 may comprise any of a wide range of user devices, including laptop or desktop computers, tablet computers, so-called "smart" phones, "smart" pads, "smart" watches, or other personal digital appliances equipped for wired or wireless communication. Representative devices 16 may each include at least one user interface device (not shown) that enables a customer service representative to interact with the representative device. In some examples, the user interface devices of representative devices 16 may be configured to receive tactile, audio, or visual input. In addition to receiving input from users, the user interface devices of representative devices 16 may be configured to output content such as GUIs for display to the customer service representatives, e.g., at display devices associated with representative devices 16.

As illustrated in FIG. 1, customer devices 12 may communicate with customer service system 14 over a network 10. In some examples, network 10 may comprise a private telecommunications network associated with a business that is hosting customer service system 14, e.g., the financial institution. In other examples, network 10 may comprise a public telecommunications network, such as the Internet. Although illustrated as a single entity, network 10 may comprise any combination of public and/or private telecommunications networks, and any combination of computer or data networks and wired or wireless telephone networks. In some examples, network 10 may comprise one or more of a wide area network (WAN) (e.g., the Internet), a virtual private network (VPN), a local area network (LAN), a wireless local area network (WLAN) (e.g., a Wi-Fi network), a wireless personal area network (WPAN) (e.g., a Bluetooth® network), or the public switched telephone network (PTSN).

The customer messages and representative messages exchanged over network 10 may be textual messages on any of a variety of different communication platforms. For example, the messages may be text messages via a short message service (SMS), "tweets" via the social network service Twitter, a status update or comment via a social media network, such as Facebook or Instagram, an email via an email service, or instant messages via a public or private instant messaging or chat service. In some examples, the customer messages and representative messages may originally be voice messages that have been transcribed into textual messages. In one example, one or more of customer devices 12 and one or more of representative devices 16 may be telephones and network 10 may be a telephone network, e.g., a landline telephone network or a wireless telephone network. In this example, computing devices within customer service system 14 may convert incoming customer voice calls and outgoing representative voice calls into textual messages using "speech to text" software.

Customer service system 14 stores textual versions of any incoming customer messages and any outgoing representative messages in message database 20. Although illustrated in FIG. 1 as being external to customer service system 14, in some examples message database 20 may be included as part of customer service system 14. In other examples, instead of storing the plurality of messages in a database, e.g., message database 20, a table including the plurality of customer and representative messages may be stored on a shared drive, website, email server, storage disc, or the like. An example of message database 20 is described below with respect to FIG. 3.

In accordance with the techniques described in this disclosure, customer service system 14 includes computing device 18 configured to efficiently evaluate message content for each of the plurality of messages included in message database 20 in order to improve communication between the customers and the customer service representatives. For example, computing device 18 may comprise a cluster of one or more computers, workstations, servers, and the like. In some examples, computing device 18 may be coupled directly to one or more of representative devices 16 within customer service system 14. In other examples, customer device 18 may be located outside of customer service system 14 and owned by a third-party message content evaluation vendor.

Customer service experiences often have a large impact on customers' perception of a company, such as the financial institution, and customers' willingness to give that company repeat business. For example, a positive customer service experience with a bank may increase the likelihood that a customer will respond to a new product offering from the bank, such as a new loan program or credit offering, open new accounts with the bank, and/or maintain or increase the account balances in their existing accounts with the bank. Conversely, a negative customer service experience with the bank may increase the likelihood that the customer will ignore any new product offerings, reduce their account balances, or completely close their accounts with the bank.

In some cases, a negative customer service experience may be the result of a communication breakdown or simple misunderstanding between the customer and a customer service representative for the company. For example, a customer may be unable to understand the terms and conditions associated with a given product offered by the bank, which may result in the customer being charged additional fees or not receiving the services they expected. As another example, a customer may be unable to understand a customer service representative's response to a complaint, which may result in a failure to reach a timely resolution. Such misunderstandings may occur when the message contents of representative messages have a reading level that is substantially different than that of customer messages, e.g., more than two grade levels different.

Conventionally, message contents of representative messages may be evaluated upon creation to verify that the message contents have a certain reading level, e.g., a seventh-grade reading level, prior to sending the messages to customers. This certain reading level, however, does not depend on the reading or comprehension ability of actual customers for a given company or product and, thus, may be too high or too low for many customers.

In addition, conventional reading level or readability evaluations are time and resource consuming. The number of messages transmitted between customers and customer service representatives may make manual evaluation of message contents unworkable. Time and resource constraints may also make evaluation of message contents by a conventional electronic readability evaluation tool unworkable. For example, reading level or readability for a piece of text is typically based, at least in part, on a number of syllables per word. A conventional electronic readability evaluation tool, e.g., a word processing application, scans the text word-for-word in order to identify vowels and count syllables. The conventional readability evaluation tool may be useful to determine a readability score for a single document, but may not be suitable for performing readability evaluations for a plurality of messages stored in a database, which may include numerous documents, texts, emails, or other messages in a customer service network scenario (e.g., millions of such messages).

According to the disclosed techniques, computing device 18 of customer service system 14 is configured to efficiently evaluate message content in each of the plurality of messages included in message database 20 in order to determine a readability score for each of the plurality of messages. Computing device 18 performs the efficient evaluation by processing the message content into a binary representation using a first value to represent vowels and a second value to represent non-vowels. The binarization of the message content in each of the plurality of messages allows computing device 18 to perform a syllable count based on a number of times the first value appears in the binarized message content. Computing device 18 then determines a readability score for each of the plurality of messages in message database 20 according to a readability metric based on the syllable count. In this way, the disclosed techniques enable the efficient performance of readability evaluations for a plurality of messages stored in a database.

Based on the readability scores, computing device 18 may identify readability gaps between the representative messages and the customer messages that result in negative outcomes. In some examples, the readability gaps may be identified based on the readability scores for multiple messages included in the same conversation or multiple messages directed to a similar topic. Computing device 18 may then generate subsequent representative messages for representative devices 16 that reduce or close the identified readability gaps. Generating offers or terms for a given product at a reading level similar to the reading level of the average customer for the given product, in accordance with the techniques of this disclosure, may reduce complaints about the given product. In addition, generating representative responses at a reading level similar to the reading level of the customer within a given conversation, in accordance with the techniques of this disclosure, may improve conflict resolution times and customer satisfaction, and may reduce customer loss and balance diminishments. An example of computing device 18 within customer service system 14 is described in more detail below with respect to FIG. 2.

The architecture of customer service system 14 illustrated in FIG. 1 is shown for exemplary purposes only and should not be limited to this architecture. Customer service system 14 illustrated in FIG. 1 includes a plurality of representative devices 16 and a single computing device 18 coupled to message database 20. In other examples, customer service system 14 may include multiple different computing devices configured to perform the message content evaluation operations described above with respect to computing device 18 for messages included in message database 20 or different message databases or other storage systems. In some examples, the message content evaluation operations described above with respect to computing device 18 may instead be performed by one or more of representative devices 16 within customer service system 14.

Figure 2:
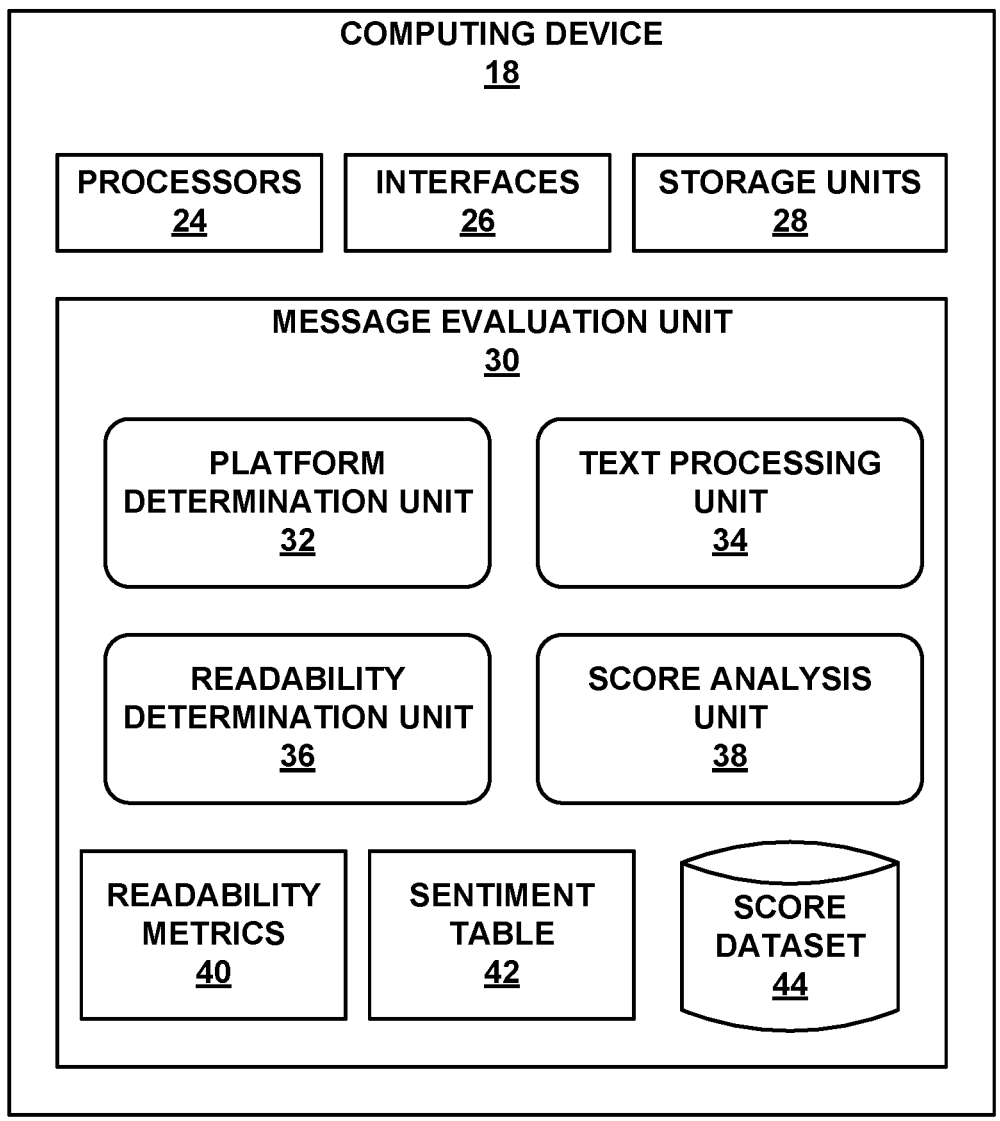
FIG. 2 is a block diagram illustrating an example computing device including a message evaluation unit configured to evaluate message content for each of a plurality of messages, in accordance with the techniques of this disclosure.

FIG. 2 is a block diagram illustrating an example of computing device 18 from FIG. 1 in more detail, including a message evaluation unit 30 configured to evaluate message content for each of a plurality of messages, in accordance with the techniques of this disclosure. The architecture of computing device 18 illustrated in FIG. 2 is shown for exemplary purposes only and computing device 18 should not be limited to this architecture. In other examples, computing device 18 may be configured in a variety of ways.

As shown in the example of FIG. 2, computing device 18 includes one or more processors 24, one or more interfaces 26, and one or more storage units 28. Computing device 18 also includes message evaluation unit 30, which may be implemented as program instructions and/or data stored in storage units 28 and executable by processors 24 or implemented as one or more hardware units or devices of computing device 18. Storage units 28 of computing device 18 may also store an operating system and a user interface unit executable by processors 24. The operating system stored in storage units 28 may control the operation of components of computing device 18. Although not shown in FIG. 2, the components, units or modules of computing device 18 are coupled (physically, communicatively, and/or operatively) using communication channels for inter-component communications. In some examples, the communication channels may include a system bus, a network connection, an inter-process communication data structure, or any other method for communicating data.

Processors 24, in one example, may comprise one or more processors that are configured to implement functionality and/or process instructions for execution within computing device 18. For example, processors 24 may be capable of processing instructions stored by storage units 28. Processors 24 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Storage units 28 may be configured to store information within computing device 18 during operation. Storage units 28 may include a computer-readable storage medium or computer-readable storage device. In some examples, storage units 28 include one or more of a short-term memory or a long-term memory. Storage units 28 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, storage units 28 are used to store program instructions for execution by processors 24. Storage units 28 may be used by software or applications running on computing device 18 (e.g., message evaluation unit 30) to temporarily store information during program execution.

Computing device 18 may utilize interfaces 26 to communicate with external devices via one or more networks. Interfaces 26 may be network interfaces, such as Ethernet interfaces, optical transceivers, radio frequency (RF) transceivers, or any other type of devices that can send and receive information. Other examples of such network interfaces may include Wi-Fi or Bluetooth radios. In some examples, computing device 18 utilizes interfaces 26 to wirelessly communicate with external devices such as message database 20 and representative devices 16 within customer service system 14.

Computing device 18 may include additional components that, for clarity, are not shown in FIG. 2. For example, computing device 18 may include a battery to provide power to the components of computing device 18. As another example, computing device 18 may include input and output user interface (UI) devices to communicate with an administrator of customer service system 14 or another user. Similarly, the components of computing device 18 shown in FIG. 2 may not be necessary in every example of computing device 18.

In the example illustrated in FIG. 2, message evaluation unit 30 includes a platform determination unit 32, a text processing unit 34, a readability determination unit 36, a score analysis unit 38, one or more readability metrics 40, a sentiment table 42, and a score dataset 44. According to the techniques of this disclosure, the components of message evaluation unit 30 of computing device 18 are configured to perform efficient evaluation of message content in each of a plurality of customer and representative messages in a database, e.g., message database 20 from FIG. 1, in order to determine a readability score for each of the messages. Based on the readability scores, message evaluation unit 30 may identify readability gaps between the representative messages and the customer messages that result in negative outcomes, and generate subsequent representative messages that reduce or close the identified readability gaps.

Message evaluation unit 30 may access the plurality of customer and representative messages to be evaluated from message database 20. As described above with respect to FIG. 1, message database 20 may include all incoming customer messages to customer service system 14 and all outgoing representative message from customer service system 14. In some examples, message evaluation unit 30 may perform readability evaluations for the plurality of messages included message database 20 on a periodic basis. For example, message evaluation unit 30 may access any new messages stored in message database 20 to perform readability evaluations on a daily, weekly, or month basis. In other examples, message evaluation unit 30 may perform readability evaluations for a given number of messages included in message database 20. For example, message evaluation unit 30 may access any new messages stored in message database 20 in batches of one thousand, ten thousand, or one hundred thousand messages to perform readability evaluations.

In some cases, for each of the plurality of messages accessed from message database 20, platform determination unit 32 of message evaluation unit 30 may determine a communication platform. For example, platform determination unit 32 may determine whether a given message is a text message via a SMS, a "tweet" via Twitter, a status update or comment via a social media network, such as Facebook or Instagram, an email via an email service, or an instant message via a public or private instant messaging or chat service. In some examples, platform determination unit 32 may determine the communication platform for a given message based on certain markers or identifiers within the message itself. In other examples, platform determination unit 32 may determine the communication platform for a given message based on a platform-type indication stored with the message in message database 20.

Based on the determined platform for the message, text processing unit 34 of message evaluation unit 30 may determine whether to perform pre-processing of the message content. For example, in the case where the communication platform is an email service, it may be assumed that the message includes a relatively small number of "message shortcuts," including acronyms, text speak, special characters, and non-text characters, e.g., emoticons, compared to the amount of standard textual content. In this case, text processing unit 34 may simply remove any message shortcuts in the email message content prior to the readability evaluation without significantly impacting the readability score. On the other hand, in the case where the communication platform is SMS or Twitter or another character limited platform, it may be assumed that the majority of the text or tweet message content is message shortcuts. In this case, text processing unit 34 may convert the message shortcuts into text for the readability evaluation. For example, text processing unit 34 may use tables to map or translate the acronyms, text speak, special characters, and non-text characters into equivalent textual descriptions.

In addition, based on the determined communication platform for the message, readability determination unit 36 of message evaluation unit 30 may select one of readability metrics 40 to be used to determine the readability score for the message content. For example, readability determination unit 36 may select one of readability metrics 40 that is capable of recognizing platform-specific message shortcuts to determine a relative readability score based on the platform. In this way, readability determination unit 36 may avoid determining an inaccurate readability score for message contents of texts, tweets, status updates, and instant messages due to the short-hand nature of these communications.

For each of the messages accessed from message database 20, readability determination unit 36 of message evaluation unit 30 performs an evaluation of the message content in order to determine a readability score according to one of readability metrics 40. It should be noted that the term "readability score," as used in this disclosure, may be defined as a score of either readability ease or reading level. Readability ease is a measure of the ease with which a reader can understand a piece of text, typically rated according to an arbitrary scale, e.g., 1 to 5 or 1 to 10. Reading level is a measure of the amount of education needed for the reader to understand the piece of text, typically rated according to grade levels. In some scenarios, readability ease may be considered to be the inverse of reading level (i.e., text having a high ease of readability requires a relatively low level of education to understand, and text having a low ease of readability requires a relatively high level of education to understand).

Readability metrics 40 may include a variety of different readability ease and reading level metrics including the Flesch reading ease test, Flesch-Kincaid grade level test, Automated Readability Index, Coleman-Liau Index, Dale-Chall Readability Formula, Gunning-Fog index, Fry Readability Formula, SMOG (Simple Measure of Gobbledygook) grade formula, and the like. These metrics define different formulae to determine readability ease or reading level for a piece of text by counting syllables, words, and/or sentences within the text.

As discussed above, conventional readability evaluation tools, e.g., word processing applications, are required to first scan a piece of text word-for-word in order to identify the vowels in each word and count the syllables based on the identified vowels. This text scanning process makes the conventional tools both time- and resource-consuming. The conventional tools, therefore, are only useful for evaluating a small number of documents at a time. The conventional tools cannot handle performing readability evaluations for a plurality of messages stored in a database, which may include millions of documents, texts, emails, or other messages in a customer service network scenario.

In accordance with the disclosed techniques, readability determination unit 36 of message evaluation unit 30 first processes or "binarizes" the message content in each of the plurality of messages accessed from message database 20 using a first value to represent vowels and a second value to represent non-vowels. For example, in each of the messages, readability determination unit 36 may use a "1" to represent vowels and a "0" to represent non-vowels in the message content. In this example, readability determination unit 36 may automatically set all vowels (i.e., letters "a," "e," "i," "o," "u," and "y") within the message content to a value of "1" using text recognition software, and set all consonants and other non-vowel characters to a value of "0."

Readability determination unit 36 then performs a syllable count on the binarized message content in each of the plurality of messages. Based on the binarization of the message content, readability determination unit 36 may count a number of syllables in each word of the message content by counting the number of "1"s, which represent vowels, appearing in each word of the binarized message content. Readability determination unit 36, therefore, does not need to scan the message content word-for-word in order to identify the vowels and count the syllables. Readability determination unit 36 then uses the syllable count, along with a word count, sentence count, or other content-based variables, to determine a readability score for each of the plurality of messages according to the one of readability metrics 40.

Readability determination unit 36 may store the readability scores for the plurality of messages in score dataset 44. The readability scores stored in score database 44 for the plurality of messages may include absolute readability scores and/or relative readability scores based on the identified communication platform. An example of score dataset 44 is described below with respect to FIG. 4.

In some scenarios, while evaluating the message content in each of the plurality of messages, readability determination unit 36 may also detect a sentiment expressed by the message content. In this way, readability determination unit 36 may determine whether a given message is negative, positive, neutral, or sarcastic. For example, sentiment table 42 may map or translate words or combinations of words to their most commonly associated sentiments. Readability determination unit 36 may look up one or more words or combination of words from the message content of the given message in sentiment table 42, and determine the sentiment expressed by the given message based on the sentiment associated with the words or combination of words.

After evaluating the message content in each of the plurality of messages, score analysis unit 38 of message evaluation unit 30 analyzes the readability score for one or more of the plurality of messages. In some examples, score analysis unit 38 may analyze the readability scores for multiple customer and representative messages included in the same conversation or multiple customer and representative messages directed to a similar topic. Based on the readability scores, score analysis unit 38 may identify readability gaps between the representative messages and the customer messages that result in negative outcomes.

Text processing unit 34 of message evaluation unit 30 may then generate message content for subsequent representative messages sent by customer service representatives via representative devices 16 to the customers based on the analysis. For example, text processing unit 34 may generate subsequent representative messages for representative devices 16 that reduce or close the identified readability gaps. In some examples, text processing unit 34 may modify existing representative messages to achieve the desired reading level. In other examples, text processing unit 34 may generate new representative messages to achieve the desired reading level. In further examples, text processing unit 34 may generate one or more subsequent representative messages related to a certain topic for selection by the customer service representatives prior to sending to the customers. In other examples, text processing unit 34 may automatically generate a single subsequent representative message related to a certain topic to be sent to the customers.

In some examples, score analysis unit 38 may analyze the readability score for a given message based on whether or not the message is interactive. The message may not be considered an interactive message if it is a single, standalone message, such as a representative product offer that does not receive a customer response, or a customer comment or complaint that does not trigger a representative response. The message may be an interactive message if it is part of a conversation between a customer and a representative. For example, interactive messages may include a customer complaint and a subsequent chain of messages between the customer and a representative to resolve the complaint, or a product offer from a representative and a subsequent chain of messages between the representative and a customer in response to the offer.

In the case of non-interactive messages, score analysis unit 38 may identify a group of customer messages included in the plurality of messages in message database 20, and calculate an average customer readability score from the readability scores for the group of customer messages. The group of customer messages may include one or more stand-alone customer messages that relate to a similar topic, e.g., complaints from different customers focused on offers or terms for the same product. Text processing unit 34 may then generate the message content for the subsequent representative messages, e.g., subsequent offers or terms for the product, to have a readability score approximately equal to the average customer readability score for the group of customer messages. Generating offers or terms for a given product at a reading level similar to the reading level of the average customer for the given product, in accordance with the techniques of this disclosure, may reduce complaints about the given product.

In the case of interactive messages, score analysis unit 38 may compare a customer readability score for at least one customer message to a representative readability score for at least one representative message that is a response to the customer message within a conversation, and identify a readability gap between the customer message and the representative message within the conversation based on the comparison. In one example, score analysis unit 38 may first calculate an average customer readability score from the readability scores for the customer messages within the conversation, and calculate an average representative readability score from the readability scores for the representative messages within the conversation. In this example, score analysis unit 38 may then identify the readability gap between the customer and representative messages within the conversation by comparing the average customer readability score to the average representative readability score.

Upon identifying the readability gap between the customer and representative messages within the conversation, score analysis unit 38 may determine whether the readability gap exceeds a threshold value. In some examples, the threshold value may be two grade levels. Based on the readability gap exceeding the threshold value, text processing unit 34 generates the message content for the subsequent representative messages to have a representative readability score that results in a readability gap between the at least one customer message and the subsequent representative messages being less than the threshold value. Generating representative responses at a reading level similar to the reading level of the customer within a given conversation, in accordance with the techniques of this disclosure, may improve conflict resolution times and customer satisfaction, and may reduce customer loss and balance diminishments.

Figure 3:
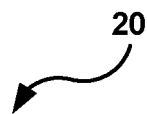
FIG. 3 is a conceptual diagram illustrating one example of a message database from FIG. 1.

FIG. 3 is a conceptual diagram illustrating one example of message database 20 from FIG. 1. The example database illustrated in FIG. 3 is merely one example of a database configured to store a plurality of customer and representative messages in a customer service scenario. The database illustrated in FIG. 3 is intended for purposes of description and should not be considered limiting.

In the example illustrated in FIG. 3, the plurality of customer and representative messages stored in message database 20 are grouped into conversations, each having a unique identifier "Convo ID." The one or more messages each have a unique identifier "Message ID." In addition, each of the messages includes an indication of a message sender, i.e., customer or representative, and an indication of message content, e.g., a complaint, an offer, or a response. In some examples, each of the messages may also include an indication of a message platform. As described above, message evaluation unit 30 of computing device 18 may determine a readability score for each of the messages included in message database 20 according to the disclosed techniques.

The conversations included in message database 20 having Convo IDs 0204, 0256, and 0397, each include interactive messages. For example, Convo ID 0204 includes a first customer message with Message ID 1455 that is a complaint, a second representative message with Message ID 1520 that is a response to the first complaint, and a third customer message with Message ID 1617 that is an additional complaint from the same customer. Similarly, Convo ID 0256 includes a customer message with Message ID 2924 that is a complaint, and a representative message with Message ID 2995 that is a response to the complaint. Convo ID 0397 includes a representative message with Message ID 3153 that is a product offer, and a customer message with Message ID 3178 that is an offer response. The conversation included in message database 20 having Convo ID 0223 includes a non-interactive customer message with Message ID 1982 that is a single, stand-alone complaint that did not receive a respresentative response.

FIG. 4 is a conceptual diagram illustrating one example of score dataset 44 from FIG. 2. The example dataset illustrated in FIG. 4 is merely one example of a database configured to store readability scores for a plurality of customer and representative messages in a customer service scenario. The dataset illustrated in FIG. 4 is intended for purposes of description and should not be considered limiting.

In the example illustrated in FIG. 4, the readability scores stored in score dataset 44 are for the plurality of customer and representative messages included in the example message database 20 from FIG. 3. The readability scores stored in score dataset 44 are grouped into conversations, each having a unique identifier "Convo ID." The one or more messages each have a unique identifier "Message ID." In addition, each of the messages includes an indication of a message sender, i.e., customer or representative, and an indication of a message readability score. In the example of FIG. 4, the readability score is a reading level score rated according to grade level. Each of the conversations includes a readability score difference between the customer messages and the representative messages within the conversation ("Convo Diff"). In other examples, each of the conversations in score dataset 44 may include average readability scores for the customer messages and the representative message within the conversation. In still other examples, score dataset 44 may include average readability scores for customer messages and representative messages related to a similar topic across different conversations.

In the case of interactive messages, message evaluation unit 30 of computing device 18 may compare a customer readability score for at least one customer message to a representative readability score for at least one representative message that is included in the same conversation, e.g., each of Convo IDs 0204, 0256, and 0397. Message evaluation unit 30 may then identify a readability gap between the customer messages and the representative messages within the same conversation based on the comparison, and generate message content for subsequent representative messages to have a representative readability score that reduces or closes the readability gap.

For example, the conversations included in score dataset 44 having Convo IDs 0204, 0256, and 0397, each include interactive messages. As one example, Convo ID 0204 includes a first customer message with Message ID 1455 and a $5^{th}$ grade reading level score, a second representative message with Message ID 1520 and a $7^{th}$ grade reading level score, and a third customer message with Message ID 1617 and a $5^{th}$ grade reading level score. Convo ID 0204, therefore, has a readability gap of two grade levels. In examples where a readability gap threshold value is two grade levels, message evaluation unit 30 may not change the reading level of the subsequent representative messages within Convo ID 0204 from a default $7^{th}$ grade reading level.

Similarly, Convo ID 0256 includes a customer message with Message ID 2924 and a $10^{th}$ grade reading level score, and a representative message with Message ID 2995 and a $7^{th}$ grade reading level score. Convo ID 0256, therefore, has a readability gap of three grade levels. In examples where a readability gap threshold value is two grade levels, message evaluation unit 30 may generate the subsequent representative messages within Convo ID 0256 to have a higher readability score, e.g., an $8^{th}$ or $9^{th}$ grade reading level score.

Convo ID 0397 includes a representative message with Message ID 3153 and a $7^{th}$ grade reading level score, and a customer message with Message ID 3178 and a $7^{th}$ grade reading level score. The readability scores for the messages included in Convo ID 0397 match. Message evaluation unit 30, therefore, will not change the reading level of the subsequent representative messages within Convo ID 0397 from the default $7^{th}$ grade reading level.

In the case of non-interactive messages, message evaluation unit 30 of computing device 18 may calculate an average customer readability score from the readability scores for a group of customer messages that relate to a similar topic. Message evaluation unit 30 may then generate message content for subsequent representative messages to have a readability score approximately equal to the average customer readability score for the group of customer messages. The conversation included in score dataset 44 having Convo ID 0223 includes a non-interactive customer message with Message ID 1982 and a $12^{th}$ grade reading level score. In some examples, based on readability score of Message ID 1982, message evaluation unit 30 may generate subsequent representative messages for the same or similar topic as Message ID 1982 to have a higher readability score than the default $7^{th}$ grade reading level.

Figure 5:
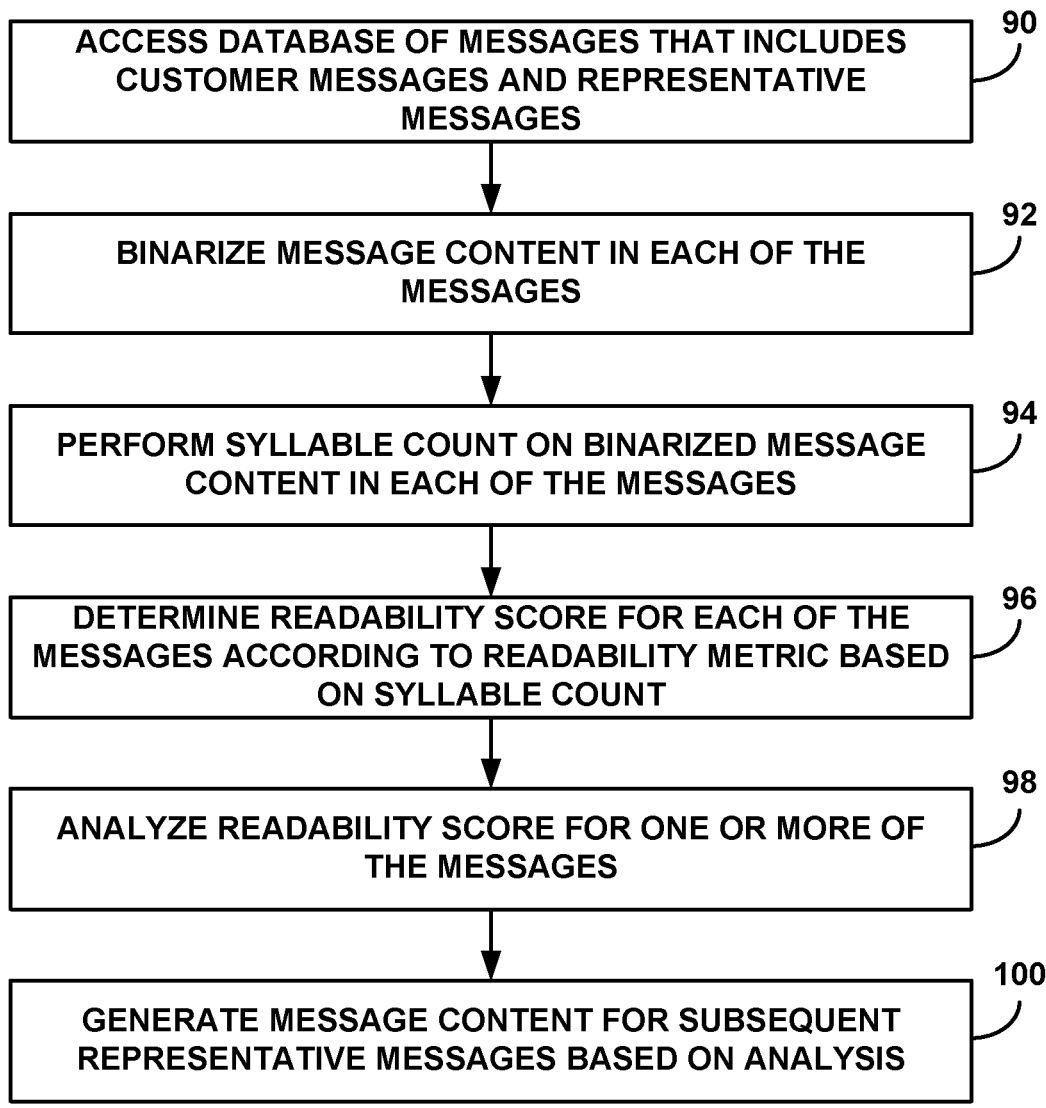
FIG. 5 is a flowchart illustrating an example operation of a computing device configured to evaluate message content for each of a plurality of messages, in accordance with the techniques of this disclosure.

FIG. 5 is a flowchart illustrating an example operation of a computing device configured to evaluate message content for each of a plurality of messages, in accordance with the techniques of this disclosure. The example operation of FIG. 5 is described with respect to computing device 18 within customer service system 14 from FIGS. 1 and 2.

Message evaluation unit 30 of computing device 18 accesses a database that includes a plurality of messages, including customer messages and representative messages (90). The customer messages may comprise messages that customer service system 14 receives from customers via customer devices 12, including complaints and responses to product offers. The representative messages may comprise messages sent by customer service representatives via representative devices 16 within customer service system 14 to the customers, including product offers and responses to customer complaints. The plurality of messages may be included in a database, e.g., message database 20, or in a table stored on a shared drive, website, email server, storage disc, or the like.

Message evaluation unit 30 evaluates message content in each of the plurality of messages included in the database. Specifically, according to the disclosed techniques, message evaluation unit 30 processes or "binarizes" the message content in each of the plurality of messages using a first value to represent vowels and a second value to represent non-vowels (92). For example, in each of the messages, message evaluation unit 30 may use a "1" to represent vowels and a "0" to represent non-vowels in the message content. Message evaluation unit 30 then performs a syllable count based on a number of times the first value appears in the binarized message content in each of the plurality of messages (94). Message evaluation unit 30 determines a readability score for each of the plurality of messages according to a readability metric based on the syllable count (96). Message evaluation unit 30 may store the readability scores for the plurality of messages in score dataset 44.

By binarizing the message content, message evaluation unit 30 may count a number of syllables in each word of the message content by counting the number of "1" s, which represent vowels, appearing in each word of the binarized message content. The text binarization technique described in this disclosure enables message evaluation unit 30 to quickly score an entire database of messages. For example, the disclosed techniques may enable efficient evaluation of message content for millions of messages included in a database or table.

In some cases, prior to evaluating the message content to determine the readability score for each of the plurality of messages, message evaluation unit 30 may determine a communication platform for one or more of the plurality of messages. For example, message evaluation unit 30 may determine whether a given message is a text message via a SMS, a "tweet" via Twitter, a status update or comment via a social media network, such as Facebook or Instagram, an email via an email service, or an instant message via a public or private instant messaging or chat service. Based on the platform, message evaluation unit 30 may perform some pre-processing of the message content to convert any non-text portions, e.g., emoticons, and other message shortcuts within the message content into text.

Message evaluation unit 30 may also select a readability metric used to determine the readability score for the messages based on the determined communication platform. For example, message evaluation unit 30 may select a readability metric from a plurality of readability metrics 40 that is capable of recognizing platform-specific message shortcuts to determine a relative readability score based on the platform. The readability scores stored in score database 44 for the plurality of messages may include absolute readability scores and/or relative readability scores based on the communication platform.

In other cases, while evaluating the message content, message evaluation unit 30 may also detect a sentiment expressed by the message content in each of the plurality of messages. For example, message evaluation unit 30 may look up one or more words or combination of words from the message content of the given message in sentiment table 42, and determine the sentiment expressed by the given message based on the sentiment associated with the words or combination of words.

After evaluating the message content in each of the plurality of messages, message evaluation unit 30 analyzes the readability score for one or more of the plurality of messages (98). In some examples, message evaluation unit 30 may analyze the readability scores for multiple messages included in the same conversation or multiple messages directed to a similar topic. Based on the readability scores, message evaluation unit 30 may identify readability gaps between the representative messages and the customer messages that result in negative outcomes.

Message evaluation unit 30 may then generate message content for subsequent representative messages to be sent by customer service representatives via representative devices 16 to the customers based on the analysis (100). For example, message evaluation unit 30 may generate subsequent representative messages for representative devices 16 that reduce or close the identified readability gaps. Generating offers or terms for a given product at a reading level similar to the reading level of the average customer for the given product, in accordance with the techniques of this disclosure, may reduce complaints about the given product. In addition, generating representative responses at a reading level similar to the reading level of the customer within a given conversation, in accordance with the techniques of this disclosure, may improve conflict resolution times and customer satisfaction, and may reduce customer loss and balance diminishments.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
    processing, by a computing device of a customer service system for a company, message content for one or more messages of a plurality of messages into a binary representation using a first value to represent vowels and a second value to represent non-vowels;
    performing a syllable count based on a number of times the first value appears in the binary representation of the message content for the one or more messages of the plurality of messages;
    determining, by the computing device, a readability score for the one or more messages of the plurality of messages according to a readability metric based on the syllable count for the one or more messages of the plurality of messages;
    analyzing, by the computing device, readability scores for a group of messages included in the plurality of messages, wherein analyzing the readability scores for the group of messages comprises:
        identifying the group of messages included in the plurality of messages as being within a same conversation, wherein the group of messages includes at least one customer message and at least one representative message that is a response to the at least one customer message, and
        calculating a readability gap between a first readability score for the at least one customer message and a second readability score for the at least one representative message within the same conversation; and
    based on the readability gap exceeding a threshold value for the group of messages, generating, by the computing device, message content having readability scores that are similar to the first readability score to be sent in one or more subsequent representative messages within the same conversation.

2. The method of claim 1, wherein generating the message content for the one or more subsequent representative messages within the same conversation comprises generating the message content for the one or more subsequent representative messages to have readability scores that are equal to the first readability score for the at least one customer message.

3. The method of claim 1, wherein generating the message content for the one or more subsequent representative messages within the same conversation comprises:
    generating message content for at least one subsequent representative message to have a third readability score,
    wherein a subsequent readability gap between the first readability score for the at least one customer message and the third readability score for the at least one subsequent representative message is less than or equal to the threshold value for the group of messages.

4. The method of claim 1, wherein generating the message content for the one or more subsequent representative messages within the same conversation comprises:
    changing a third readability score used to generate the one or more subsequent representative messages from a default readability score to be similar to the first readability score; and
    generating the message content for the one or more subsequent representative messages using the third readability score, wherein a subsequent readability gap between the first readability score for the at least one customer message and the third readability score for the one or more subsequent representative messages is less than or equal to the threshold value for the group of messages.

5. The method of claim 1, wherein analyzing the readability scores for the group of messages further comprises:
    calculating the first readability score as an average of readability scores for two of more customer messages included in the group of messages; and
    calculating the second readability score as an average of readability scores for two or more representative messages included in the group of messages.

6. The method of claim 1, further comprising:
    determining the first readability score for the at least one customer message included in the group of messages based on first message content for the at least one customer message and the readability metric; and
    determining the second readability score for the at least one representative message included in the group of messages based on second message content for the at least one representative message and the readability metric.

7. The method of claim 1, further comprising:
    determining a readability score for the one or more messages of the plurality of messages; and
    storing the readability score for the one or more messages of the plurality of messages in a dataset.

8. A computing device of a customer service system for a company, the device comprising:
    one or more storage units configured to store readability scores for a plurality of messages; and
    one or more processors in communication with the one or more storage units and configured to:
        process message content for one or more messages of the plurality of messages into a binary representation using a first value to represent vowels and a second value to represent non-vowels;

perform a syllable count based on a number of times the first value appears in the binary representation of the message content for the one or more messages of the plurality of messages;

determine a readability score for the one or more messages of the plurality of messages according to a readability metric based on the syllable count for each message of the plurality of messages;

analyze readability scores for a group of messages included in the plurality of messages, wherein, to analyze the readability scores for the group of messages, the one or more processors are further configured to:

identify the group of messages included in the plurality of messages as being within a same conversation, wherein the group of messages includes at least one customer message and at least one representative message that is a response to the at least one customer message, and calculate a readability gap between a first readability score for the at least one customer message and a second readability score for the at least one representative message within the same conversation; and based on the readability gap exceeding a threshold value for the group of messages, generate message content having readability scores that are similar to the first readability score to be sent in one or more subsequent representative messages within the same conversation.

9. The device of claim 8, wherein, to generate the message content for the one or more subsequent representative messages within the same conversation, the one or more processors are configured to generate the message content for the one or more subsequent representative messages to have readability scores that are equal to the first readability score for the at least one customer message.

10. The device of claim 8, wherein, to generate the message content for the one or more subsequent representative messages within the same conversation, the one or more processors are configured to:

generate message content for at least one subsequent representative message to have a third readability score, wherein a subsequent readability gap between the first readability score for the at least one customer message and the third readability score for the at least one subsequent representative message is less than or equal to the threshold value for the group of messages.

11. The device of claim 8, wherein, to generate the message content for the one or more subsequent representative messages within the same conversation, the one or more processors are configured to:

change a third readability score used to generate the one or more subsequent representative messages from a default readability score to be similar to the first readability score; and generate message content for the one or more subsequent representative messages using the third readability score, wherein a subsequent readability gap between the first readability score for the at least one customer message and the third readability score for the one or more subsequent representative messages is less than or equal to the threshold value for the group of messages.

12. The device of claim 8, wherein, to analyze the readability scores for the group of messages, the one or more processors are configured to:

calculate the first readability score as an average of readability scores for two of more customer messages included in the group of messages; and calculate the second readability score as an average of readability scores for two or more representative messages included in the group of messages.

13. The device of claim 8, wherein the one or more processors are configured to:

determine the first readability score for the at least one customer message included in the group of messages based on first message content for the at least one customer message and the readability metric; and determine the second readability score for the at least one representative message included in the group of messages based on second message content for the at least one representative message and the readability metric.

14. The device of claim 8, wherein the one or more processors are configured to:

determine a readability score for the one or more messages of the plurality of messages; and store the readability score for the one or more messages of the plurality of messages in a dataset.

15. A non-transitory computer-readable medium comprising instructions that when executed cause one or more processors of a computing device of a customer service system for a company to:

process message content for one or more messages of a plurality of messages into a binary representation using a first value to represent vowels and a second value to represent non-vowels;

perform a syllable count based on a number of times the first value appears in the binary representation of the message content for the one or more messages of the plurality of messages;

determine a readability score for the one or more messages of the plurality of messages according to a readability metric based on the syllable count for the one or more messages of the plurality of messages;

analyze readability scores for a group of messages included in the plurality of messages, wherein, to analyze the readability scores for the group of messages, the instructions further cause the one or more processors to:

identify the group of messages included in the plurality of messages as being within a same conversation, wherein the group of messages includes at least one customer message and at least one representative message that is a response to the at least one customer message, and calculate a readability gap between a first readability score for the at least one customer message and a second readability score for the at least one representative message within the same conversation; and based on the readability gap exceeding a threshold value for the group of messages, generate message content having readability scores that are similar to the first readability score to be sent in one or more subsequent representative messages within the same conversation.

* * * * *